(12) United States Patent
Kim

(10) Patent No.: US 11,769,931 B2
(45) Date of Patent: Sep. 26, 2023

(54) LONG WIDTH SECONDARY BATTERY

(71) Applicant: SK INNOVATION CO., LTD., Seoul (KR)

(72) Inventor: Ji Hyung Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 513 days.

(21) Appl. No.: 16/866,728

(22) Filed: May 5, 2020

(65) Prior Publication Data

US 2020/0388815 A1 Dec. 10, 2020

(30) Foreign Application Priority Data

Jun. 4, 2019 (KR) .................. 10-2019-0066011

(51) Int. Cl.
*H01M 50/54* (2021.01)
*H01M 50/46* (2021.01)

(52) U.S. Cl.
CPC .......... *H01M 50/46* (2021.01); *H01M 50/54* (2021.01); *H01M 2220/20* (2013.01)

(58) Field of Classification Search
CPC .. H01M 50/502; H01M 50/531; H01M 50/46; H01M 2220/20; H01M 10/0431; H01M 50/538; H01M 50/54; H01M 10/0585; H01M 50/543; H01M 10/0413; H01M 50/514; H01M 50/503; Y02E 60/10; Y02P 70/50
See application file for complete search history.

(56) References Cited

U.S. PATENT DOCUMENTS

| | | | | |
|---|---|---|---|---|
| 10,991,973 B2* | 4/2021 | Lee | ........ | H01M 50/502 |
| 2013/0252053 A1 | 9/2013 | Woo | | |
| 2014/0370345 A1* | 12/2014 | Maleki | ........ | H01M 50/24 |
| | | | | 429/94 |
| 2016/0204410 A1* | 7/2016 | Heo | ........ | H01M 50/20 |
| | | | | 429/158 |
| 2016/0248073 A1* | 8/2016 | Jang | ........ | H01M 50/531 |
| 2017/0125771 A1* | 5/2017 | Kwon | ........ | H01M 50/55 |
| 2019/0379015 A1* | 12/2019 | Ochi | ........ | H01M 50/20 |

FOREIGN PATENT DOCUMENTS

| | | |
|---|---|---|
| EP | 2683010 A1 | 1/2014 |
| KR | 10-1776282 B1 | 9/2017 |
| WO | WO-2013080966 A1 * 6/2013 | ........ H01M 10/0587 |

OTHER PUBLICATIONS

Machine translation of specification of WO2013080966A1 (Year: 2013).*

* cited by examiner

*Primary Examiner* — William E McClain
*Assistant Examiner* — Jason Barton
(74) *Attorney, Agent, or Firm* — IP & T GROUP LLP

(57) ABSTRACT

In the present invention, not only a movement path of a current generated from a first electrode assembly, but also a movement path of a current generated from a second electrode assembly are provided by a cathode conductive member, and not only a movement path of the current generated from the second electrode assembly, but also a movement path of the current generated from the first electrode assembly are provided by an anode conductive member, such that cross sectional areas of the correct movement paths are increased. Therefore, a resistance of the long width secondary battery may be reduced.

8 Claims, 6 Drawing Sheets

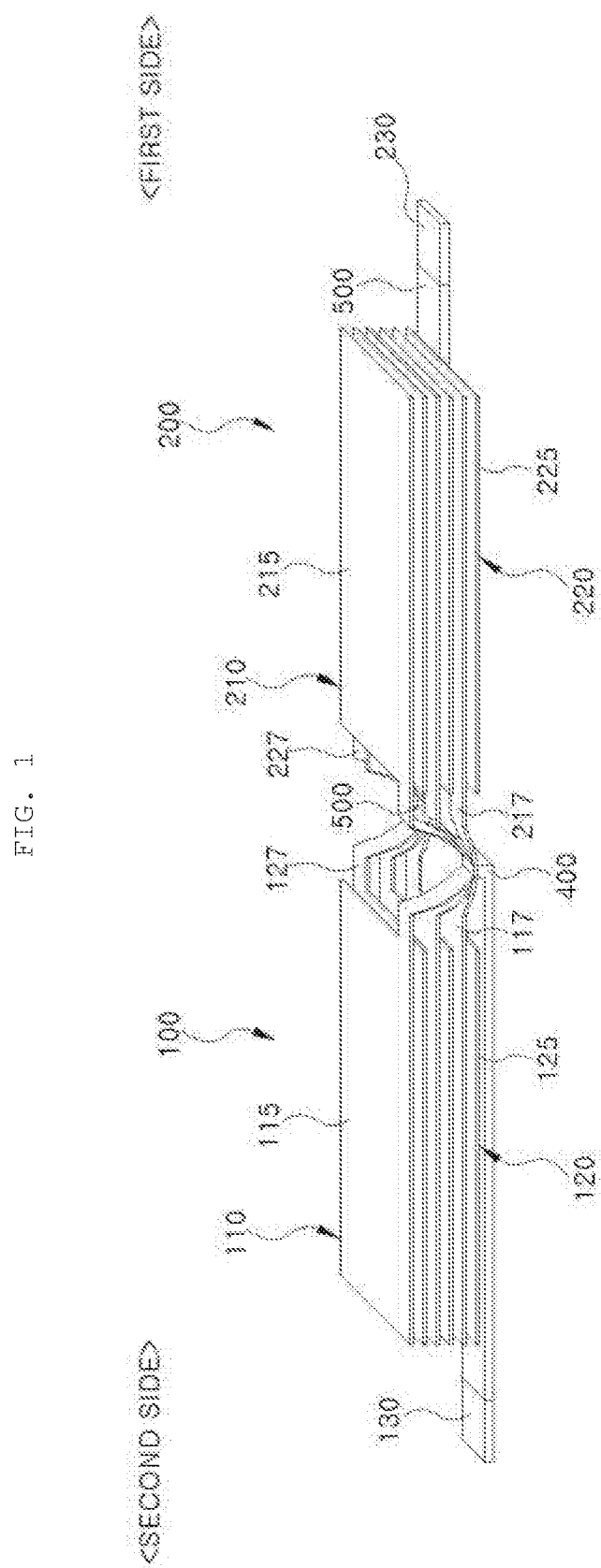

LONG WIDTH SECONDARY BATTERY

CROSS-REFERENCE TO RELATED APPLICATIONS

This application claims priority under 35 U.S.C. § 119 to Korean Patent Application No. 10-2019-0066011, filed on Jun. 4, 2019, in the Korean Intellectual Property Office, the disclosure of which is incorporated herein by reference in its entirety.

TECHNICAL FIELD

The following disclosure relates to a long width secondary battery in which current movement paths are additionally provided in order to reduce a resistance thereof.

BACKGROUND

A battery may be classified into a primary battery and a secondary battery. The primary battery refers to a battery which cannot be reused after it is used one time, because the primary battery produces electricity using an irreversible reaction. Examples of the primary battery include a dry battery, a mercury battery, and a voltaic battery. On the other hand, the secondary battery refers to a battery which can be reused after use, because the secondary cell battery is recharged by a reversible reaction. Examples of the secondary battery include a lead storage battery, a lithium ion battery, and a Ni—Cd battery.

The secondary battery may be classified into a stacked-type secondary battery and a wound-type secondary battery depending on the forms of a cathode plate, an anode plate, and a separator. Here, in the case of the stacked-type secondary battery, the longer the lateral widths of a cathode plate and an anode plate, the longer the current movement path during charge and discharge, and the longer the current movement path, the greater the resistance of the stacked-type secondary battery.

A stacked-type secondary battery having relatively long widths of a cathode plate and an anode plate (that is, long width secondary battery) may be used in an electric vehicle or a hybrid vehicle. In the case of the long width secondary battery used in the electric vehicle or the hybrid vehicle, the lower the resistance, the higher the electrical output. However, the long width secondary battery has a relatively high resistance due to the long widths of the cathode plate and the anode plate. Accordingly, a large amount of loss in electrical output generated from the long width secondary battery may occur.

RELATED ART DOCUMENT

Patent Document 1

(Patent Document 1) Korean Patent Publication No. 1776282 (published on Sep. 1, 2017)

SUMMARY

An embodiment of the present invention is directed to providing a long width secondary battery of which a resistance may be reduced and a loss in electrical output may thus be reduced.

Another embodiment of the present invention is directed to providing a long width secondary battery of which a strength and an assembly efficiency may be improved.

In one aspect, a long width secondary battery includes: a first electrode assembly including a plurality of first cathode plates corresponding to portions of first cathode current collectors where a cathode active material is coated, a plurality of first anode plates corresponding to portions of first anode current collectors where an anode active material is coated, and a first separator disposed between each of the first cathode plates and each of the first anode plates; and a second electrode assembly including a plurality of second cathode plates corresponding to portions of second cathode current collectors where a cathode active material is coated, a plurality of second anode plates corresponding to portions of second anode current collectors where an anode active material is coated, and a second separator disposed between each of the second cathode plates and each of the second anode plates, wherein the first cathode plate has a first cathode uncoated portion that corresponds to a portion of the first cathode current collector where the cathode active material is not coated and is positioned on a first side of the first electrode assembly, and the first anode plate has a first anode uncoated portion that corresponds to a portion of the first anode current collector where the anode active material is not coated and is positioned on the first side of the first electrode assembly, the second cathode plate has a second cathode uncoated portion that corresponds to a portion of the second cathode current collector where the cathode active material is not coated, is positioned on a second side of the second electrode assembly, and is connected to the first cathode uncoated portion, and the second anode plate has a second anode uncoated portion that corresponds to a portion of the second anode current collector where the anode active material is not coated, is positioned on the second side of the second electrode assembly, and is connected to the first anode uncoated portion, and the first cathode uncoated portion and the second cathode uncoated portion are connected to a cathode tab positioned on a second side of the first electrode assembly by a cathode conductive member, and the first anode uncoated portion and the second anode uncoated portion are connected to an anode tab positioned on a first side of the second electrode assembly by an anode conductive member.

The first electrode assembly and the second electrode assembly may be disposed in a state in which the first side of the first electrode assembly and the second side of the second electrode assembly face each other, the cathode tab may be provided on the second side of the first electrode assembly, and the anode tab may be provided on the first side of the second electrode assembly.

The cathode conductive member and the anode conductive member may be formed in a plate shape.

A thickness of the cathode conductive member may be larger than those of the first cathode current collector and the second cathode current collector, and a thickness of the anode conductive member may be larger than those of the first anode current collector and the second anode current collector.

The cathode conductive member and the anode conductive member may be formed in an electric wire shape.

The first cathode current collector, the second cathode current collector, and the cathode conductive member may be formed of the same materials, and the first anode current collector, the second anode current collector, and the anode conductive member may be formed of the same materials.

The long width secondary battery may further include a support member supporting the first electrode assembly and the second electrode assembly, wherein the cathode conductive member and the anode conductive member may be provided on the support member.

A step may be provided on the support member, the first electrode assembly may be disposed on one side of the support member based on the step, and the second electrode assembly may be disposed on the other side of the support member based on the step, and the first cathode uncoated portion and the second cathode uncoated portion may be connected to the cathode conductive member at the step, and the first anode uncoated portion and the second anode uncoated portion may be connected to the anode conductive member at the step.

In another general aspect, a long width secondary battery includes: a first electrode assembly including a plurality of first cathode plates corresponding to portions of first cathode current collectors where a cathode active material is coated, a plurality of first anode plates corresponding to portions of first anode current collectors where an anode active material is coated, and a first separator disposed between each of the first cathode plates and each of the first anode plates; a second electrode assembly including a plurality of second cathode plates corresponding to portions of second cathode current collectors where a cathode active material is coated, a plurality of second anode plates corresponding to portions of second anode current collectors where an anode active material is coated, and a second separator disposed between each of the second cathode plates and each of the second anode plates; and a third electrode assembly including a plurality of third cathode plates corresponding to portions of third cathode current collectors where a cathode active material is coated, a plurality of third anode plates corresponding to portions of third anode current collectors where an anode active material is coated, and a third separator disposed between each of the third cathode plates and each of the third anode plates, and disposed between the first electrode assembly and the second electrode assembly, wherein the first cathode plate has a first cathode uncoated portion that corresponds to a portion of the first cathode current collector where the cathode active material is not coated and is positioned on a first side of the first electrode assembly, and the first anode plate has a first anode uncoated portion that corresponds to a portion of the first anode current collector where the anode active material is not coated and is positioned on the first side of the first electrode assembly, the second cathode plate has a second cathode uncoated portion that corresponds to a portion of the second cathode current collector where the cathode active material is not coated and is positioned on a second side of the second electrode assembly, and the second anode plate has a second anode uncoated portion that corresponds to a portion of the second anode current collector where the anode active material is not coated and is positioned on the second side of the second electrode assembly, the third cathode plate has a third cathode uncoated portion that corresponds to a portion of the third cathode current collector where the cathode active material is not coated, is positioned on a second side of the third electrode assembly, and is connected to the first cathode uncoated portion, and a fourth cathode uncoated portion that is positioned on a first side of the third electrode assembly and is connected to the second cathode uncoated portion, the third anode plate has a third anode uncoated portion that corresponds to a portion of the third anode current collector where the anode active material is not coated, is positioned on the second side of the third electrode assembly, and is connected to the first anode uncoated portion, and a fourth anode uncoated portion that is positioned on the first side of the third electrode assembly and is connected to the second anode uncoated portion, the first cathode uncoated portion and the third cathode uncoated portion are connected to a cathode tab positioned on a second side of the first electrode assembly by a first cathode conductive member, and the second cathode uncoated portion and the fourth cathode uncoated portion are connected to the first cathode uncoated portion and the third cathode uncoated portion by a second cathode conducive member, and the second anode uncoated portion and the fourth anode uncoated portion are connected to an anode tab positioned on a first side of the second electrode assembly by a first anode conductive member, and the first anode uncoated portion and the third anode uncoated portion are connected to the second anode uncoated portion and the fourth anode uncoated portion by a second anode conductive member.

The first electrode assembly and the third electrode assembly may be disposed in a state in which the first side of the first electrode assembly and the second side of the third electrode assembly face each other, the second electrode assembly and the third electrode assembly may be disposed in a state in which the second side of the second electrode assembly and the first side of the third electrode assembly face each other, the cathode tab may be provided on the second side of the first electrode assembly, and the anode tab may be provided on the first side of the second electrode assembly.

The first cathode conductive member, the second cathode conductive member, the first anode conductive member, and the second anode conductive member may be formed in a plate shape.

Thicknesses of the first cathode conductive member and the second cathode conductive member may be larger than those of the first cathode current collector, the second cathode current collector, and the third cathode current collector, and thicknesses of the first anode conductive member and the second anode conductive member may be larger than those of the first anode current collector, the second anode current collector, and the third anode current collector.

The first cathode conductive member, the second cathode conductive member, the first anode conductive member, and the second anode conductive member may be formed in an electric wire shape.

The first cathode current collector, the second cathode current collector, the third cathode current collector, the first cathode conductive member, and the second cathode conductive member may be formed of the same materials, and the first anode current collector, the second anode current collector, the third anode current collector, the first anode conductive member, and the second anode conductive member may be formed of the same materials.

The long width secondary battery may further include a support member supporting the first electrode assembly, the second electrode assembly, and the third electrode assembly, wherein the first cathode conductive member, the second cathode conductive member, the first anode conductive member, and the second anode conductive member may be provided on the support member.

A plurality of steps may be provided on the support member, the first electrode assembly may be disposed on one side of the support member based on one of the plurality of steps, the second electrode assembly may be disposed on the other side of the support member based on the other one of the plurality of steps, and the third electrode assembly may be disposed between the plurality of steps, the first cathode uncoated portion and the third cathode uncoated portion may be connected to the first cathode conductive member and the second cathode conductive member at one of the plurality of steps, and the second cathode uncoated portion and the fourth cathode uncoated portion may be connected to the second cathode conductive member at the other one of the plurality of steps, and the second anode uncoated portion and the fourth anode uncoated portion may be connected to the first anode conductive member and the second anode conductive member at one of the plurality of steps, and the first anode uncoated portion and the third anode uncoated portion may be connected to the second anode conductive member at the other one of the plurality of steps.

Other features and aspects will be apparent from the following detailed description, the drawings, and the claims.

BRIEF DESCRIPTION OF THE DRAWINGS

FIG. 1 is a front perspective view of a long width secondary battery according to a first exemplary embodiment of the present invention.

DETAILED DESCRIPTION OF MAIN ELEMENTS

Figure 2A:
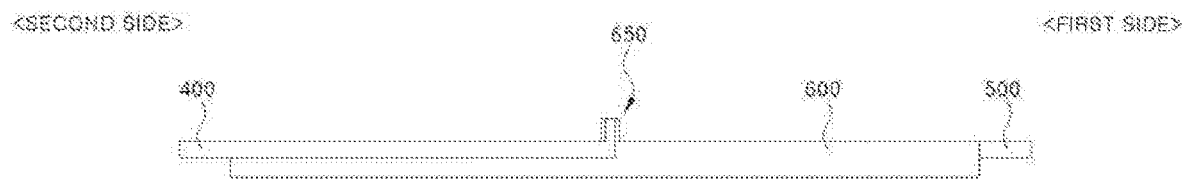
FIG. 2A is a front view of a support member supporting an electrode assembly of FIG. 1.

100: First electrode assembly
110: First cathode plate
115: First cathode current collector
117: First cathode uncoated portion
120: First anode plate
125: First anode current collector
127: First anode uncoated portion
130: Cathode tab
200: Second electrode assembly
210: Second cathode plate
215: Second cathode current collector
217: Second cathode uncoated portion
220: Second anode plate
225: Second anode current collector
227: Second anode uncoated portion
230: Anode tab
300: Third electrode assembly
310: Third cathode plate
315: Third cathode current collector
317: Third cathode uncoated portion
320: Third anode plate
325: Third anode current collector
327-1: Third anode uncoated portion
327-2: Fourth anode uncoated portion
400: Cathode conductive member
500: Anode conductive member
600: Support member
650: Step

DETAILED DESCRIPTION OF EMBODIMENTS

Hereinafter, a long width secondary battery according to the present invention will be described in detail with reference to the accompanying drawings. The accompanying drawings are provided by way of example in order to sufficiently transfer the spirit of the present invention to those skilled in the art, and the present invention is not limited to the accompanying drawings provided below, but may be implemented in other forms.

FIG. 1 is a front perspective view of a long width secondary battery according to a first exemplary embodiment of the present invention. As illustrated in FIG. 1, the long width secondary battery according to the first exemplary embodiment of the present invention includes a first electrode assembly 100, a second electrode assembly 200, a cathode conductive member 400, and an anode conductive member 500.

The first electrode assembly 100 and the second electrode assembly 200 may be short width secondary batteries. The first electrode assembly 100 and the second electrode assembly 200 may be disposed in a state in which a first side of the first electrode assembly 100 and a second side of the second electrode assembly 200 face each other. Therefore, a long width secondary battery may be formed. A cathode tab 130 may be provided on a second side of the first electrode assembly 100, and an anode tab 230 may be provided on a first side of the second electrode assembly 200.

The first electrode assembly 100 includes a plurality of first cathode plates 110 corresponding to portions of first cathode current collectors 115 where a cathode active material is coated, a plurality of first anode plates 120 corresponding to portions of first anode current collectors 125 where an anode active material is coated, and a first separator (not illustrated) disposed between each of the first cathode plates 110 and each of the first anode plates 120. Here, the first cathode current collector 115 may be an aluminum foil, and the first anode current collector 125 may be a copper foil. The portion of the first cathode current collector 115 where the cathode active material is coated (first cathode coated portion) and the portion of the first anode current collector 125 where the anode active material is coated (first anode coated portion) are chemically reacted each other to generate a current.

The first cathode plate 110 has a first cathode uncoated portion 117 that corresponds to the portion of the first cathode current collector 115 where the cathode active material is not coated, and is positioned on the first side of the first electrode assembly 100. A plurality of first cathode uncoated portions 117 are welded to each other and are connected to a plurality of second cathode uncoated portions 217.

The first anode plate 120 has a first anode uncoated portion 127 that corresponds to the portion of the first anode current collector 125 where the anode active material is not coated, and is positioned on the first side of the first electrode assembly 100. A plurality of first anode uncoated portions 127 are welded to each other and are connected to a plurality of second anode uncoated portions 227.

The second electrode assembly 200 includes a plurality of second cathode plates 210 corresponding to portions of second cathode current collectors 215 where a cathode active material is coated, a plurality of second anode plates 220 corresponding to portions of second anode current collectors 225 where an anode active material is coated, and a second separator (not illustrated) disposed between each of the second cathode plates 210 and each of the second anode plates 220. Here, the second cathode current collector 215 may be an aluminum foil, and the second anode current collector 225 may be a copper foil. The portion of the second cathode current collector 215 where the cathode active material is coated (second cathode coated portion) and the portion of the second anode current collector 225 where the anode active material is coated (second anode coated portion) are chemically reacted to each other to generate a current.

The second cathode plate 210 has the second cathode uncoated portion 217 that corresponds to the portion of the second cathode current collector 215 where the cathode active material is not coated, and is positioned on the second side of the second electrode assembly 200. The plurality of second cathode uncoated portions 217 are welded to each other and are connected to the plurality of first cathode uncoated portions 117. Here, the plurality of first cathode uncoated portions 117 and the plurality of second cathode uncoated portions 217 may also be connected to each other by welding.

In addition, the first cathode uncoated portion 117 and the second cathode uncoated portion 217 are connected to the cathode tab 130 positioned on the second side of the first electrode assembly 100 by the cathode conductive member 400. That is, one end of the cathode conductive member 400 that is positioned on a first side of the cathode conductive member 400 is connected to the first cathode uncoated portion 117 and the second cathode uncoated portion 217, and the other end of the cathode conductive member 400 that is positioned on a second side of the cathode conductive member 400 is connected to the cathode tab 130. The cathode conductive member 400 not only connects the first cathode uncoated portion 117 to the cathode tab 130 to provide a movement path of a current generated from the first electrode assembly 100, but also connects the second cathode uncoated portion 217 to the cathode tab 130 to provide a movement path of a current generated from the second electrode assembly 200. The cathode conductive member 400 and the cathode uncoated portions 117 and 217, and the cathode conductive member 400 and the cathode tab 130 may be connected to each other by welding, respectively.

The second anode plate 220 has the second anode uncoated portion 227 that corresponds to the portion of the second anode current collector 225 where the anode active material is not coated, and is positioned on the second side of the second electrode assembly 200. The plurality of second anode uncoated portions 227 are welded to each other and are connected to the plurality of first anode uncoated portions 127. Here, the plurality of first anode uncoated portions 127 and the plurality of second anode uncoated portions 227 may also be connected to each other by welding.

In addition, the first cathode uncoated portion 127 and the second cathode uncoated portion 227 are connected to the anode tab 230 positioned on the first side of the second electrode assembly 200 by the anode conductive member 500. That is, one end of the anode conductive member 500 that is positioned on a first side of the anode conductive member 500 is connected to the anode tab 230, and the other end of the anode conductive member 500 that is positioned on a second side of the anode conductive member 500 is connected to the first anode uncoated portion 127 and the second anode uncoated portion 227. The anode conductive member 500 not only connects the second anode uncoated portion 227 to the anode tab 230 to provide a movement path of the current generated from the second electrode assembly 200, but also connects the first anode uncoated portion 127 to the anode tab 230 to provide a movement path of the current generated from the first electrode assembly 100. The anode conductive member 500 and the anode uncoated portions 127 and 227, and the anode conductive member 500 and the anode tab 230 may be connected to each other by welding, respectively.

As such, in the case where not only the movement path of the current generated from the first electrode assembly 100, but also the movement path of the current generated from the second electrode assembly 200 are provided by the cathode conducive member 400, and not only the movement path of the current generated from the second electrode assembly 200, but also the movement path of the current generated from the first electrode assembly 100 are provided by the anode conductive member 500, cross sectional areas of the current movement paths are increased, and a resistance of the long width secondary battery is thus reduced.

The cathode conductive member 400 and the anode conductive member 500 may be formed in a plate shape. The conductive member formed in a plate shape allows the cross sectional areas of the current movement paths to be increased, and the resistance of the long width secondary battery is easily reduced.

As illustrated in FIG. 1, the cathode conductive member 400 may provide the current movement path at a lower portion of the first electrode assembly 100, and the anode conductive member 500 may provide the current movement path at a lower portion of the second electrode assembly 200. However, the cathode conductive member 400 may provide the current movement path at an upper portion or one side surface portion of the first electrode assembly 100, and the anode conductive member 500 may provide the current movement path at an upper portion or one side surface portion of the second electrode assembly 200.

Thicknesses of the cathode conductive member 400 and the anode conductive member 500 are closely related to the cross sectional areas of the current movement paths. That is, the cross sectional area of the current movement path may be increased in proportion to the thickness of each of the cathode conductive member 400 and the anode conductive member 500. As a result, the resistance of the long width secondary battery may be reduced. However, since thicknesses of the cathode current collectors 115 and 215 and the anode current collectors 125 and 225 are also related to the cross sectional areas of the current movement paths, in order to greatly reduce the resistance of the long width secondary battery, it is preferable that the thickness of the cathode conductive member 400 is larger than those of the cathode current collectors 115 and 215, and the thickness of the anode conductive member 500 is larger than those of the anode current collectors 125 and 225.

The cathode conductive member 400 and the anode conductive member 500 formed only in a plate shape are illustrated in FIG. 1, but the cathode conductive member 400 and the anode conductive member 500 may be formed in an electric wire shape having a width narrower than that of the place shape. Since the electric wire shape has a cross sectional area smaller than that of the plate shape, the electric wire shape has a low degree of contribution to reduction in resistance of the long width secondary battery, but may allow the production of a small and lightweight long width secondary. Moreover, the cathode conductive member 400 and the anode conductive member 500 formed in an electric wire shape have a high energy density, and thus the long width secondary battery may provide a relatively high electrical output.

As described above, one end of the cathode conductive member 400 that is positioned on the first side of the cathode conductive member 400 is connected to the first cathode uncoated portion 117 and the second cathode uncoated portion 217, and one end of the anode conductive member 500 that is positioned on the second side of the anode conductive member 500 is connected to the first anode uncoated portion 127 and the second anode uncoated portion 227. In this case, in general, the conductive member and the uncoated portion are connected to each other by ultrasonic welding. When the conductive member and the uncoated portion are formed of the same materials, the ultrasonic welding may be further smoothly performed. Therefore, it is preferable that the first cathode current collector 115, the second cathode current collector 215, and the cathode conductive member 400 are formed of the same materials, and the first anode current collector 125, the second anode current collector 225, and the anode conductive member 500 are formed of the same materials. For example, when the cathode current collectors 115 and 215 are formed of an aluminum material, it is preferable that the cathode conductive member 400 is also formed of the aluminum material. When the anode current collectors 125 and 225 are formed of a copper material, it is preferable that the anode conductive member 500 is also formed of the copper material.

Figure 2B:
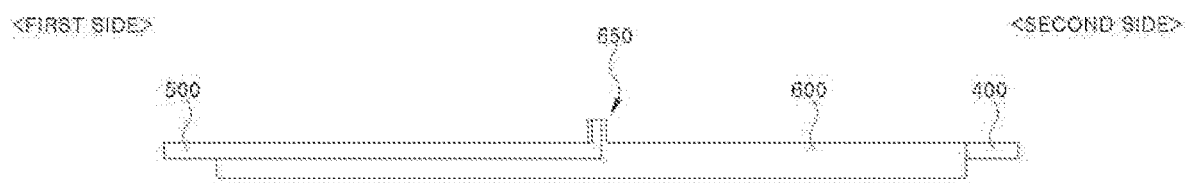
FIG. 2B is a rear view of the support member supporting the electrode assembly of FIG. 1.
Figure 3:
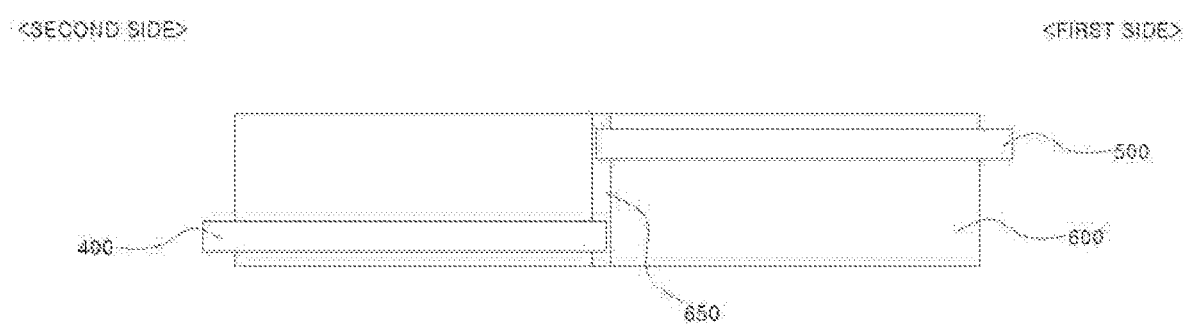
FIG. 3 is a plan view of the support member supporting the electrode assembly of FIG. 1.
Figure 4:
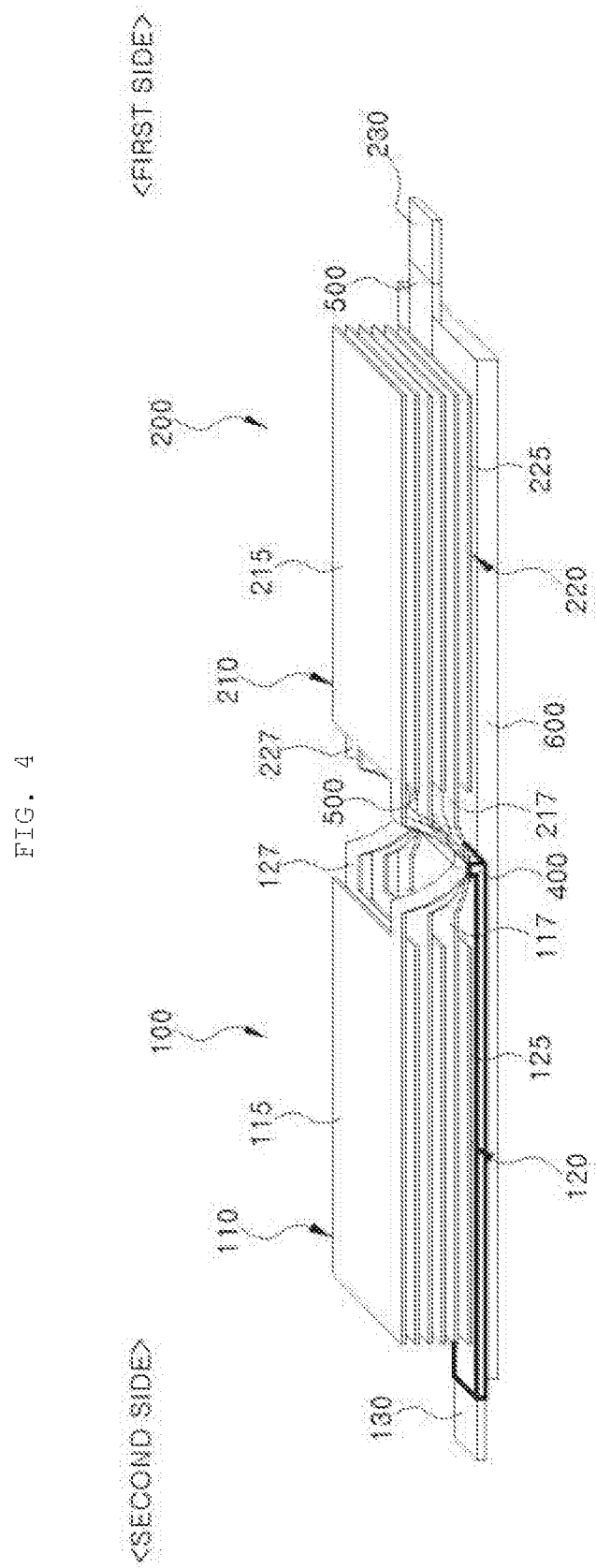
FIG. 4 is a view illustrating a state in which the electrode assembly of FIG. 1 is mounted on the support member.

FIG. 2A is a front view of the support member supporting the electrode assembly of FIG. 1, and FIG. 2B is a rear view of the support member supporting the electrode assembly of the FIG. 1. FIG. 3 is a plan view of the support member supporting the electrode assembly of FIG. 1, and FIG. 4 is a view illustrating a state in which the electrode assembly of FIG. 1 is mounted on the support member.

As illustrated in FIGS. 2A to 4, the long width secondary battery according to the first exemplary embodiment of the present invention may further include a support member 600 supporting the first electrode assembly 100 and the second electrode assembly 200. The support member 600 is disposed at the lower portions of the electrode assemblies 100 and 200 and supports the electrode assemblies 100 and 200, such that the support member 600 may contribute to improving a strength of the long width secondary battery.

In addition, the cathode conductive member 400 and the anode conductive member 500 may be provided on the support member 600. More specifically, a step 650 is provided at an approximately central portion of the support member 600. The cathode conductive member 400 extends from the step 650 toward one side of the support member 600. The anode conductive member 500 extends from the step 650 toward the other side of the support member 600.

In this case, the cathode conductive member 400 may be provided at a position corresponding to the first cathode uncoated portion 117 and the second cathode uncoated portion 217, for example, a portion biased forward of the support member 600, in order to connect the first cathode uncoated portion 117 and the second cathode uncoated portion 217. In addition, the anode conductive member 500 may be provided at a position corresponding to the first anode uncoated portion 127 and the second anode uncoated portion 227, for example, a portion biased rearward of the support member 600, in order to connect the first anode uncoated portion 127 and the second anode uncoated portion 227.

The first electrode assembly 100 may be disposed on one side of the support member 600 based on the step 650, and the second electrode assembly 200 may be disposed on the other side of the support member 600 based on the step 650. In addition, the first cathode uncoated portion 317 and the second cathode uncoated portion 217 may be connected to each other at the step 650 by welding with the cathode conductive member 400. The first anode uncoated portion 127 and the second anode uncoated portion 227 may be connected to each other at the step 650 by welding with the anode conductive member 500.

As such, the electrode assemblies 100 and 200 are disposed on the support member 600 provided with the step 650, the cathode uncoated portions 117 and 217 are connected to the cathode conductive member 400 at the step 650, and the anode uncoated portions 127 and 227 are connected to the anode conductive member 500 at the step 650, such that a strength and an assembly efficiency of the long width secondary battery may be increased.

Figure 5:
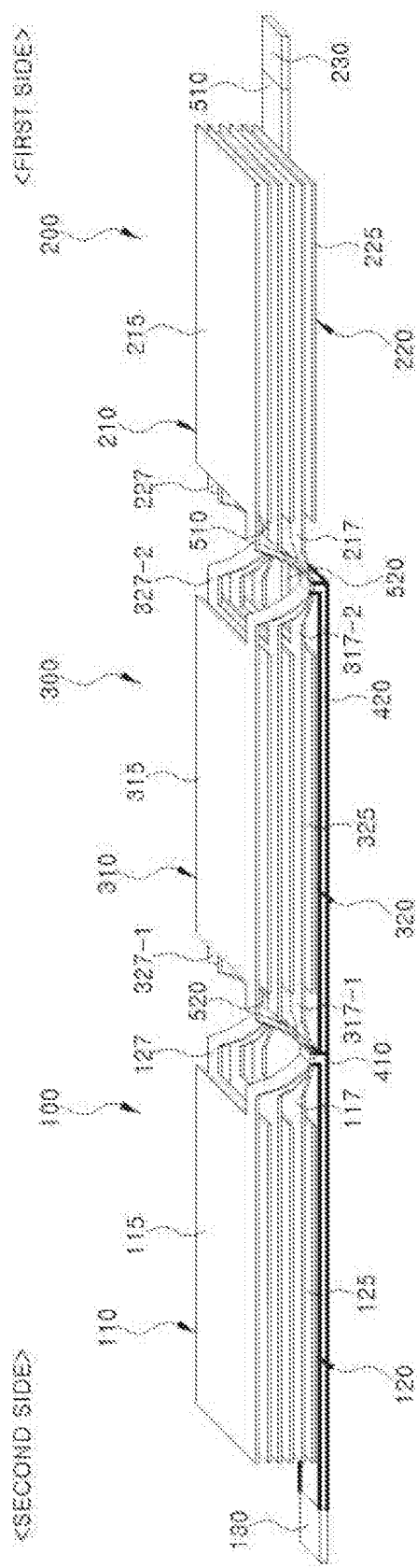
FIG. 5 is a front perspective view of a long width secondary battery according to a second exemplary embodiment of the present invention.

Meanwhile, FIG. 5 is a front perspective view of a long width secondary battery according to a second exemplary embodiment of the present invention. As illustrated in FIG. 5, the long width secondary battery according to the second exemplary embodiment of the present invention includes a first electrode assembly 100, a second electrode assembly 200, a third electrode assembly 300, a first cathode conductive member 410, a second cathode conductive member 420, a first anode conductive member 510, and a second anode conductive member 520. The second exemplary embodiment of the present invention is different from the first exemplary embodiment in that the third electrode assembly 300 is disposed between the first electrode assembly 100 and the second electrode assembly 200, and a plurality of cathode conductive members 410 and 420 and a plurality of anode conductive members 510 and 520 are included. Hereinafter, the second exemplary embodiment will be described, focusing on the differences from the first exemplary embodiment.

The third electrode assembly 300 may be a short width secondary battery. The first electrode assembly 100 and the third electrode assembly 300 may be disposed in a state in which a first side of the first electrode assembly 100 and a second side of the third electrode assembly 300 face each other, and the second electrode assembly 200 and the third electrode assembly 300 may be disposed in a state in which a second side of the second electrode assembly 200 and a first side of the third electrode assembly 300 face each other. Therefore, a long width secondary battery may be formed. A cathode tab 130 may be provided on a second side of the first electrode assembly 100, and an anode tab 230 may be provided on a first side of the second electrode assembly 200.

The third electrode assembly 300 includes a plurality of third cathode plates 310 corresponding to portions of third cathode current collectors 315 where a cathode active material is coated, a plurality of third anode plates 320 corresponding to portions of third anode current collectors 325 where an anode active material is coated, and a third separator (not illustrated) disposed between each of the third cathode plates 310 and each of the third anode plates 320. Here, the third cathode current collector 315 may be an aluminum foil, and the third anode current collector 325 may be a copper foil. The portion of the third cathode current collector 315 where the cathode active material is coated (third cathode coated portion) and the portion of the third anode current collector 325 where the anode active material is coated (third anode coated portion) are chemically reacted to each other to generate a current.

The third cathode plate 310 has a third cathode uncoated portion 317-1 and a fourth cathode uncoated portion 317-2 that correspond to the portion of the third cathode current collector 315 where the cathode active material is not coated, the third cathode uncoated portion 317-1 being positioned on the second side of the third electrode assembly 300 and connected to a first cathode uncoated portion 117 of the first electrode assembly 100, and the fourth cathode uncoated portion 317-2 being positioned on the first side of the third electrode assembly 300 and connected to a second cathode uncoated portion 217 of the second electrode assembly 200. That is, a plurality of third cathode uncoated portions 317-1 are welded to each other and are connected to the plurality of first cathode uncoated portions 117. A plurality of fourth cathode uncoated portions 317-2 are welded to each other and are connected to the plurality of second cathode uncoated portions 217. Here, the plurality of first cathode uncoated portions 117 and the plurality of third cathode uncoated portions 317-1 may also be connected to each other by welding, and the plurality of second cathode uncoated portions 217 and the plurality of fourth cathode uncoated portions 317-2 may also be connected to each other by welding.

In addition, the first cathode uncoated portion 117 and the third cathode uncoated portion 317-1 are connected to the cathode tab 130 positioned on the second side of the first electrode assembly 100 by the first cathode conductive member 410. That is, one end of the first cathode conductive member 410 that is positioned on a first side of the first cathode conductive member 410 is connected to the first cathode uncoated portion 117 and the third cathode uncoated portion 317-1, and the other end of the first cathode conductive member 410 that is positioned on a second side of the first cathode conductive member 410 is connected to the cathode tab 130. The first cathode conductive member 410 not only connects the first cathode uncoated portion 117 to the cathode tab 130 to provide a movement path of a current generated from the first electrode assembly 100, but also connects the third cathode uncoated portion 317-1 to the cathode tab 130 to provide a movement path of a current generated from the third electrode assembly 300. The first cathode conductive member 410 and the cathode uncoated portions 117 and 317-1, and the first cathode conductive member 410 and the cathode tab 130 may be connected to each other by welding, respectively.

In addition, the second cathode uncoated portion 217 and the fourth cathode uncoated portion 317-2 are connected to the first cathode uncoated portion 117 and the third cathode uncoated portion 317-1 by the second cathode conductive member 420. That is, one end of the second cathode conductive member 420 that is positioned on a first side of the second cathode conductive member 420 is connected to the second cathode uncoated portion 217 and the fourth cathode uncoated portion 317-2, and the other end of the second cathode conductive member 420 that is positioned on a second side of the second cathode conductive member 420 is connected to the first cathode uncoated portion 117 and the third cathode uncoated portion 317-1. The second cathode conductive member 420 not only connects the fourth cathode uncoated portion 317-2 to the first cathode uncoated portion 117 and the third cathode uncoated portion 317-1 to provide a movement path of the current generated from the third electrode assembly 300, but also connects the second cathode uncoated portion 217 to the first cathode uncoated portion 117 and the third cathode uncoated portion 317-1 to provide a movement path of a current generated from the second electrode assembly 200. The second cathode conductive member 420 and the cathode uncoated portions 217 and 317-2, and the second cathode conductive member 420 and the cathode uncoated portions 117 and 317-1 may be connected to each other by welding, respectively.

The third anode plate 320 has a third anode uncoated portion 327-1 and a fourth anode uncoated portion 327-2 that correspond to the portion of the third anode current collector 325 where the anode active material is not coated, the third anode uncoated portion 327-1 being positioned on the second side of the third electrode assembly 300 and connected to a first anode uncoated portion 127 of the first electrode assembly 100, and the fourth anode uncoated portion 327-2 being positioned on the first side of the third electrode assembly 300 and connected to a second anode uncoated portion 227 of the second electrode assembly 200. That is, a plurality of third anode uncoated portions 327-1 are welded to each other and are connected to the plurality of first anode uncoated portions 127. A plurality of fourth anode uncoated portions 327-2 are welded to each other and are connected to the plurality of second anode uncoated portions 227. Here, the plurality of first anode uncoated portions 127 and the plurality of third anode uncoated portions 327-1 may also be connected to each other by welding, and the plurality of second anode uncoated portions 227 and the plurality of fourth anode uncoated portions 327-2 may also be connected to each other by welding.

In addition, the second anode uncoated portion 227 and the fourth anode uncoated portion 327-2 are connected to the anode tab 230 positioned on the first side of the second electrode assembly 200 by the first anode conductive member 510. That is, one end of the first anode conductive member 510 that is positioned on a first side of the first anode conductive member 510 is connected to the anode tab 230, and the other end of the first anode conductive member 510 that is positioned on a second side of the first anode conductive member 510 is connected to the second anode uncoated portion 227 and the fourth anode uncoated portion 327-2. The anode conductive member 510 not only connects the second anode uncoated portion 227 to the anode tab 230 to provide a movement path of the current generated from the second electrode assembly 200, but also connects the fourth anode uncoated portion 327-2 to the anode tab 230 to provide a movement path of the current generated from the third electrode assembly 300. The first anode conductive member 510 and the anode uncoated portions 227 and 327-2, and the first anode conductive member 510 and the anode tab 230 may be connected to each other by welding, respectively.

In addition, the first anode uncoated portion 127 and the third anode uncoated portion 327-1 are connected to the second anode uncoated portion 227 and the fourth anode uncoated portion 327-2 by the second anode conductive member 520. That is, one end of the second anode conductive member 520 that is positioned on a first side of the second anode conductive member 520 is connected to the second anode uncoated portion 227 and the fourth anode uncoated portion 327-2, and the other end of the second anode conductive member 520 that is positioned on a second side of the second anode conductive member 520 is connected to the first anode uncoated portion 127 and the third anode uncoated portion 327-1. The second anode conductive member 520 not only connects the third anode uncoated portion 327-1 to the second anode uncoated portion 227 and the fourth anode uncoated portion 327-2 to provide a movement path of the current generated from the third electrode assembly 300, but also connects the first anode uncoated portion 127 to the second anode uncoated portion 227 and the fourth anode uncoated portion 327-2 to provide a movement path of the current generated from the first electrode assembly 100. The second anode conductive member 520 and the anode uncoated portions 127 and 327-1, and the second anode conductive member 520 and the anode uncoated portions 227 and 327-2 may be connected to each other by welding, respectively.

As such, in the case where the cathode conductive members 410 and 420 provide not only the movement path of the current generated from the first electrode assembly 100 but also the movement paths of the currents generated from the second electrode assembly 200 and the third electrode assembly 300, and the anode conductive members 510 and 520 provide not only the movement path of the current generated from the second electrode assembly 200 but also the movement paths of the currents generated from the first electrode assembly 100 and the third electrode assembly 300, cross sectional areas of the current movement paths are increased, and a resistance of the long width secondary battery is thus reduced.

The cathode conductive members 410 and 420 and the anode conductive members 510 and 520 may be formed in a plate shape. The conductive member formed in a plate shape allows the cross sectional areas of the current movement paths to be increased, and the resistance of the long width secondary battery is easily reduced.

As illustrated in FIG. 5, the first cathode conductive member 410 may provide the current movement path at a lower portion of the first electrode assembly 100, and the second cathode conductive member 420 may provide the current movement path at a lower portion of the third electrode assembly 300. However, the first cathode conductive member 410 may provide the current movement path at an upper portion or one side surface portion of the first electrode assembly 100, and the second cathode conductive member 420 may provide the current movement path at an upper portion or one side surface portion of the third electrode assembly 300.

In addition, the first anode conductive member 510 may provide the current movement path at a lower portion of the second electrode assembly 200, and the second anode conductive member 520 may provide the current movement path at the lower portion of the third electrode assembly 300. However, the first anode conductive member 510 may provide the current movement path at an upper portion or one side surface portion of the second electrode assembly 200, and the second anode conductive member 520 may provide the current movement path at the upper portion or one side surface portion of the third electrode assembly 300.

Thicknesses of the cathode conductive members 410 and 420 and the anode conductive members 510 and 520 are closely related to the cross sectional areas of the current movement paths. That is, the cross sectional area of the current movement path may be increased in proportion to the thickness of each of the cathode conductive members 410 and 420 and each of the anode conductive members 510 and 520. As a result, the resistance of the long width secondary battery may be reduced. However, since thicknesses of the cathode current collectors 115, 215, and 315 and the anode current collectors 125, 225, and 325 are also related to the cross sectional areas of the current movement paths, in order to greatly reduce the resistance of the long width secondary battery, it is preferable that the thickness of each of the cathode conductive members 410 and 420 is larger than those of the cathode current collectors 115, 215, and 315, and the thickness of each of the anode conductive members 510 and 520 is larger than those of the anode current collectors 125, 225, and 325.

The cathode conductive members 410 and 420 and the anode conductive members 510 and 520 formed only in a plate shape are illustrated in FIG. 5, but the cathode conductive members 410 and 420 and the anode conductive members 510 and 520 may be formed in an electric wire shape. Since the electric wire shape has a cross sectional area smaller than that of the plate shape, the electric wire shape has a low degree of contribution to reduction in resistance of the long width secondary battery, but may allow the production of a small and lightweight long width secondary. Moreover, the cathode conductive members 410 and 420 and the anode conductive members 510 and 520 formed in an electric wire shape have a high energy density, and thus the long width secondary battery may provide a relatively high electrical output.

As described above, one end of the first cathode conductive member 410 that is positioned on the first side of the first cathode conductive member 410 is connected to the first cathode uncoated portion 117 and the third cathode uncoated portion 317-1, one end of the second cathode conductive member 420 that is positioned on the first side of the second cathode conductive member 420 is connected to the second cathode uncoated portion 217 and the fourth cathode uncoated portion 317-2, and the other end of the second cathode conductive member 420 that is positioned on the second side of the second cathode conductive member 420 is connected to the first cathode uncoated portion 117 and the third cathode uncoated portion 317-1. In addition, the other end of the first anode conductive member 510 that is positioned on a second side of the first anode conductive member 510 is connected to the second anode uncoated portion 227 and the fourth anode uncoated portion 327-2, one end of the second anode conductive member 520 that is positioned on the first side of the second anode conductive member 520 is connected to the second anode uncoated portion 227 and the fourth anode uncoated portion 327-2, and the other end of the second anode conductive member 520 that is positioned on the second side of the second anode conductive member 520 is connected to the first anode uncoated portion 127 and the third anode uncoated portion 327-1. In this case, in general, the conductive member and the uncoated portion are connected to each other by ultrasonic welding. When the conductive member and the uncoated portion are formed of the same materials, the ultrasonic welding may be smoothly performed. Therefore, it is preferable that the first cathode current collector 115, the second cathode current collector 215, the third cathode current collector 315, the first cathode conductive member 410, and the second cathode conductive member 420 are formed of the same materials, and the first anode current collector 125, the second anode current collector 225, the third anode current collector 325, the first anode conductive member 510, and the second anode conductive member 520 are formed of the same materials. For example, when the cathode current collectors 115, 215, and 315 are formed of an aluminum material, it is preferable that the cathode conductive members 410 and 420 are also formed of the aluminum material. When the anode current collectors 125, 225, and 325 are formed of a copper material, it is preferable that the anode conductive members 510 and 520 are also formed of the copper material.

Figure 6A:
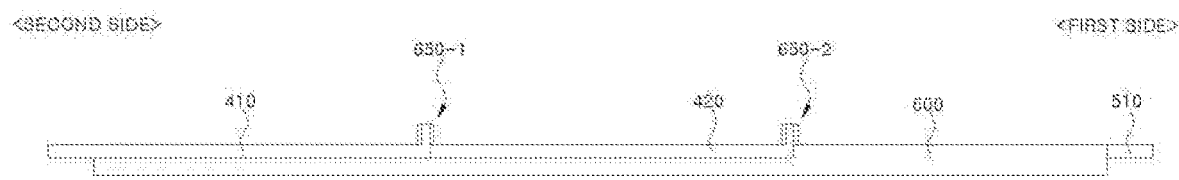
FIG. 6A is a front view of a support member supporting an electrode assembly of FIG. 5.
Figure 6B:
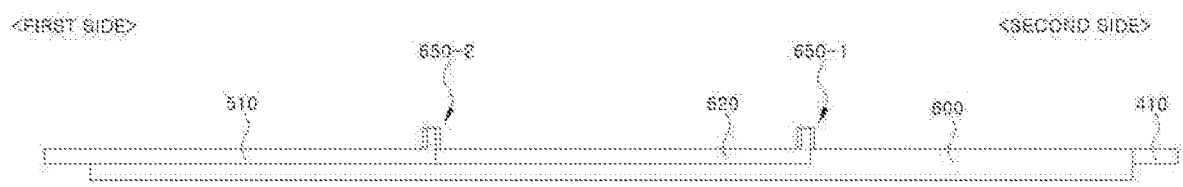
FIG. 6B is a rear view of the support member supporting the electrode assembly of FIG. 5.
Figure 7:
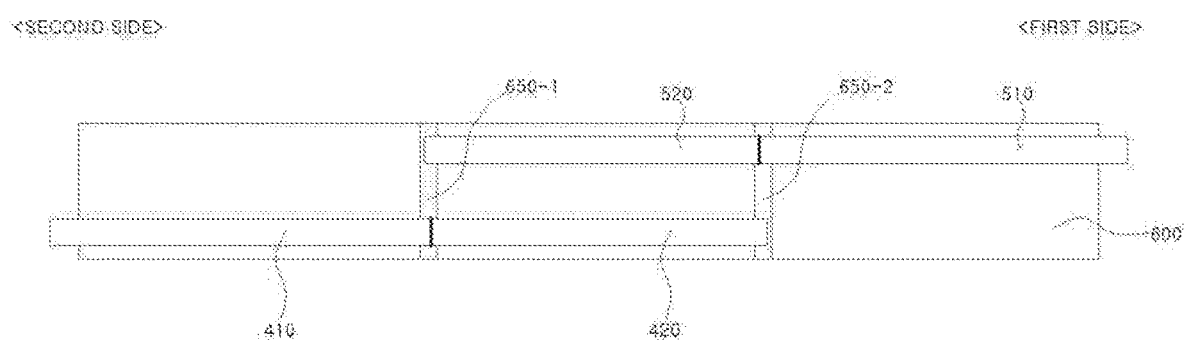
FIG. 7 is a plan view of the support member supporting the electrode assembly of FIG. 5.
Figure 8:
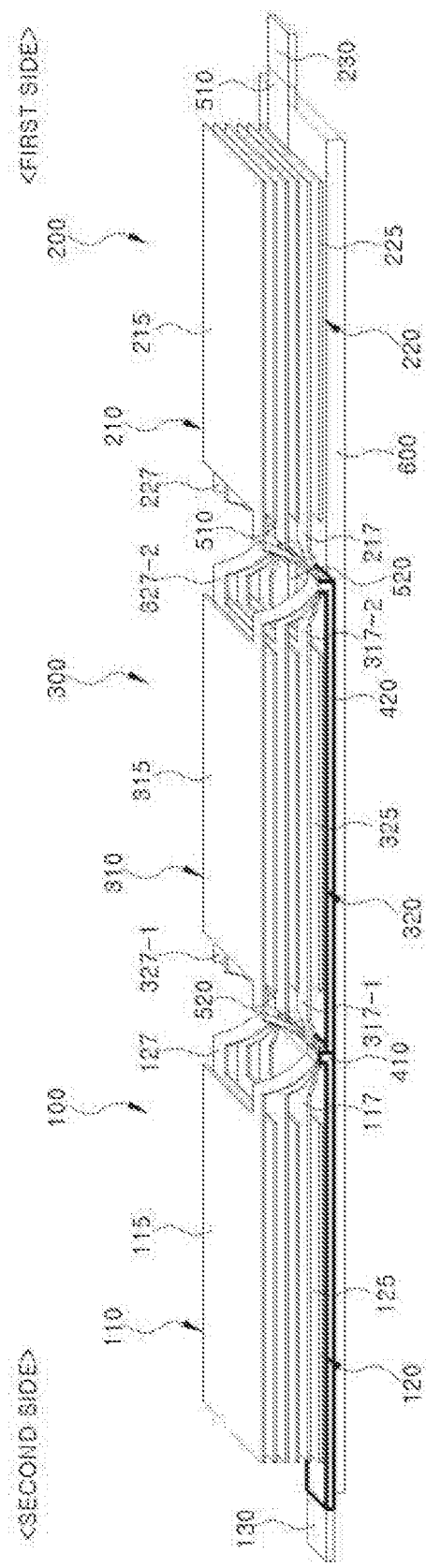
FIG. 8 is a view illustrating a state in which the electrode assembly of FIG. 5 is mounted on the support member.

FIG. 6A is a front view of the support member supporting the electrode assembly of FIG. 5, and FIG. 6B is a rear view of the support member supporting the electrode assembly of the FIG. 5. FIG. 7 is a plan view of the support member supporting the electrode assembly of FIG. 5, and FIG. 8 is a view illustrating a state in which the electrode assembly of FIG. 5 is mounted on the support member.

As illustrated in FIGS. 6A to 8, the long width secondary battery according to the second exemplary embodiment of the present invention may further include a support member 600 supporting the first electrode assembly 100, the second electrode assembly 200, and the third electrode assembly 300. The support member 600 is disposed at the lower portions of the electrode assemblies 100, 200, and 300, and supports the electrode assemblies 100, 200, and 300, such that the support member 600 may contribute to improving a strength of the long width secondary battery.

In addition, the cathode conductive members 410 and 420 and the anode conductive members 510 and 520 may be provided on the support member 600. More specifically, a plurality of steps 650-1 and 650-2 are provided on the support member 600. The first cathode conductive member 410 extends from the first step 650-1 toward one side of the support member 600. The second cathode conductive member 420 extends over the first step 650-1 and the second step 650-2. Here, the first cathode conductive member 410 and the second cathode conductive member 420 may be separately formed and then connected to each other by welding, or may be integrally formed. In addition, the first anode conductive member 510 extends from the second step 650-2 toward the other side of the support member 600. The second anode conductive member 520 extends over the first step 650-1 and the second step 650-2. Here, the first anode conductive member 510 and the second anode conductive member 520 may be separately formed and then connected to each other by welding, or may be integrally formed.

In this case, the cathode conductive members 410 and 420 may be provided at a position corresponding to the cathode uncoated portions 117, 217, 317-1, and 317-2, for example, a portion biased forward of the support member 600, in order to connect the cathode uncoated portions 117, 217, 317-1, and 317-2. In addition, the anode conductive members 510 and 520 may be provided at a position corresponding to the anode uncoated portions 127, 227, 327-1, and 327-2, for example, a portion biased rearward of the support member 600, in order to connect the anode uncoated portions 127, 227, 327-1, and 327-2.

The first electrode assembly 100 may be disposed one side of the support member 600 based on one of the plurality of steps 650-1 and 650-2, that is, the first step 650-1. The second electrode assembly 200 may be disposed the other side of the support member 600 based on the other one of the plurality of steps 650-1 and 650-2, that is, the second step 650-2. In addition, the third electrode assembly 300 may be disposed between the first step 650-1 and the second step 650-2.

The first cathode uncoated portion 117 and the third cathode uncoated portion 317-1 may be connected to the first cathode conductive member 410 and the second cathode conductive member 420 by welding at the first step 650-1. In addition, the second cathode uncoated portion 217 and the fourth cathode uncoated portion 317-2 may be connected to the second cathode conductive member 420 by welding at the second step 650-2.

The second anode uncoated portion 227 and the fourth anode uncoated portion 327-2 may be connected to the first anode conductive member 510 and the second anode conductive member 520 by welding at the second step 650-2. In addition, the first anode uncoated portion 127 and the third anode uncoated portion 327-1 may be connected to the second anode conductive member 520 by welding at the first step 650-1.

As such, the electrode assemblies 100, 200, and 300 are disposed on the support member 600 provided with the steps 650-1 and 650-2, the cathode uncoated portions 117, 217, 317-1 and 317-2 are connected to the cathode conductive members 410 and 420 at the steps 650-1 and 650-2, and the anode uncoated portions 127, 227, 327-1, and 327-2 are connected to the anode conductive members 510 and 520, such that a strength and an assembly efficiency of the long width secondary battery may be increased.

In the second exemplary embodiment of the present invention. It has been described that three electrode assemblies are sequentially disposed; however, the number of electrode assemblies sequentially disposed may be four or more. That is, in FIG. 5, it has been described that only one electrode assembly (that is, the third electrode assembly 300) is disposed between the first electrode assembly 100 and the second electrode assembly 200; however, a plurality of electrode assemblies may be disposed therebetween. The plurality of electrode assemblies disposed between the first electrode assembly 100 and the second electrode assembly 200 may be the third electrode assembly 300. In addition, when the number of electrode assemblies sequentially disposed is four or more, a length of the support member 600 is required to be increased in proportion to the number of electrode assemblies, and the number of steps provided on the support member 600 is also required to be three or more.

As set forth above, according to the present invention, not only the movement path of the current generated from the first electrode assembly, but also the movement path of the current generated from the second electrode assembly are provided by the cathode conductive member, and not only the movement path of the current generated from the second electrode assembly, but also the movement path of the current generated from the first electrode assembly are provided by the anode conductive member, such that the cross sectional areas of the current movement paths are increased. Therefore, the resistance of the long width secondary battery may be reduced.

Further, according to the present invention, the electrode assembly is disposed on the support member provided with the step, and the cathode uncoated portion and the cathode conductive member are connected to each other at the step, and the anode uncoated portion and the anode conductive member are connected to each other at the step, such that a strength and an assembly efficiency of the long width secondary battery may be improved.

Although the present invention has been described with reference to the exemplary embodiments and the accompanying drawings, it is not limited to the above-mentioned exemplary embodiments but may be variously modified and changed from the above description by those skilled in the art to which the present invention pertains. Therefore, the technical spirit of the present invention should be understood only by the claims, and all of the equivalences and equivalent modifications to the claims are intended to fall within the technical spirit of the present invention.

What is claimed is:

1. A long width secondary battery comprising:
   a first electrode assembly including a plurality of first cathode plates corresponding to portions of first cathode current collectors where a cathode active material is coated, a plurality of first anode plates corresponding to portions of first anode current collectors where an anode active material is coated, and a first separator disposed between each of the first cathode plates and each of the first anode plates;

a second electrode assembly including a plurality of second cathode plates corresponding to portions of second cathode current collectors where a cathode active material is coated, a plurality of second anode plates corresponding to portions of second anode current collectors where an anode active material is coated, and a second separator disposed between each of the second cathode plates and each of the second anode plates; and a cathode conductive member and an anode conductive member, wherein the first electrode assembly and the second electrode assembly are disposed in a state in which a right side of the first electrode assembly and a left side of the second electrode assembly face each other, the cathode tab is provided on the left side of the first electrode assembly, and the anode tab is provided on the right side of the second electrode assembly, the first cathode plate has a first cathode uncoated portion that corresponds to a portion of the first cathode current collector where the cathode active material is not coated and is positioned on a right side of the first electrode assembly, and the first anode plate has a first anode uncoated portion that corresponds to a portion of the first anode current collector where the anode active material is not coated and is positioned on the right side of the first electrode assembly, the second cathode plate has a second cathode uncoated portion that corresponds to a portion of the second cathode current collector where the cathode active material is not coated, is positioned on a left side of the second electrode assembly, and is connected to the first cathode uncoated portion, and the second anode plate has a second anode uncoated portion that corresponds to a portion of the second anode current collector where the anode active material is not coated, is positioned on the left side of the second electrode assembly, and is connected to the first anode uncoated portion, one end of the cathode conductive member is connected to the first cathode uncoated portion and the second cathode uncoated portion and the other end of the cathode conductive member is connected to the cathode tab such that the first cathode uncoated portion and the second cathode uncoated portion connected to each other are connected to the cathode tab, and one end of the anode conductive member is connected to the first anode uncoated portion and the second anode uncoated portion and the other end of the anode conductive member is connected to the anode tab such that the first anode uncoated portion and the second anode uncoated portion connected to each other are connected to the anode tab, wherein the first electrode assembly, the second electrode assembly, the cathode conductive member and the anode conductive member are enclosed within a case, further comprising a support member supporting the first electrode assembly and the second electrode assembly, wherein the cathode conductive member and the anode conductive member are provided on the support member, and wherein a protrusion upwardly protruding is provided on the support member, the first electrode assembly is disposed on the support member positioned at a left side of the protrusion, and the second electrode assembly is disposed on the support member positioned at a right side of the protrusion, and the first cathode uncoated portion and the second cathode uncoated portion are connected to the cathode conductive member at the protrusion, and the first anode uncoated portion and the second anode uncoated portion are connected to the anode conductive member at the protrusion.

2. The long width secondary battery of claim 1, wherein the cathode conductive member and the anode conductive member are formed in a plate shape.

3. The long width secondary battery of claim 2, wherein a thickness of the cathode conductive member is larger than those of the first cathode current collector and the second cathode current collector, and a thickness of the anode conductive member is larger than those of the first anode current collector and the second anode current collector.

4. The long width secondary battery of claim 1, wherein the first cathode current collector, the second cathode current collector, and the cathode conductive member are formed of the same materials, and the first anode current collector, the second anode current collector, and the anode conductive member are formed of the same materials.

5. A long width secondary battery comprising:

a first electrode assembly including a plurality of first cathode plates corresponding to portions of first cathode current collectors where a cathode active material is coated, a plurality of first anode plates corresponding to portions of first anode current collectors where an anode active material is coated, and a first separator disposed between each of the first cathode plates and each of the first anode plates;

a second electrode assembly including a plurality of second cathode plates corresponding to portions of second cathode current collectors where a cathode active material is coated, a plurality of second anode plates corresponding to portions of second anode current collectors where an anode active material is coated, and a second separator disposed between each of the second cathode plates and each of the second anode plates;

a third electrode assembly including a plurality of third cathode plates corresponding to portions of third cathode current collectors where a cathode active material is coated, a plurality of third anode plates corresponding to portions of third anode current collectors where an anode active material is coated, and a third separator disposed between each of the third cathode plates and each of the third anode plates, and disposed between the first electrode assembly and the second electrode assembly; and a first cathode conductive member, a second cathode conductive member, a first anode conductive member and a second anode conductive member, wherein the first electrode assembly and the third electrode assembly are disposed in a state in which a right side of the first electrode assembly and a left side of the third electrode assembly face each other, the second electrode assembly and the third electrode assembly are disposed in a state in which a left side of the second electrode assembly and a right side of the third electrode assembly face each other, the cathode tab is provided on the left side of the first electrode assembly, and the anode tab is provided on the right side of the second electrode assembly, the first cathode plate has a first cathode uncoated portion that corresponds to a portion of the first cathode current collector where the cathode active material is not coated and is positioned on a right side of the first electrode assembly, and the first anode plate has a first anode uncoated portion that corresponds to a portion of the first anode current collector where the anode active material is not coated and is positioned on the right side of the first electrode assembly, the second cathode plate has a second cathode uncoated portion that corresponds to a portion of the second cathode current collector where the cathode active material is not coated and is positioned on a left side of the second electrode assembly, and the second anode plate has a second anode uncoated portion that corresponds to a portion of the second anode current collector where the anode active material is not coated and is positioned on the left side of the second electrode assembly, the third cathode plate has a third cathode uncoated portion that corresponds to a portion of the third cathode current collector where the cathode active material is not coated, is positioned on a left side of the third electrode assembly, and is connected to the first cathode uncoated portion, and a fourth cathode uncoated portion that is positioned on a right side of the third electrode assembly and is connected to the second cathode uncoated portion, the third anode plate has a third anode uncoated portion that corresponds to a portion of the third anode current collector where the anode active material is not coated, is positioned on the left side of the third electrode assembly, and is connected to the first anode uncoated portion, and a fourth anode uncoated portion that is positioned on the right side of the third electrode assembly and is connected to the second anode uncoated portion one end of the first cathode conductive member is connected to the first cathode uncoated portion and the third cathode uncoated portion and the other end of the first cathode conductive member is connected to the cathode tab such that the first cathode uncoated portion and the third cathode uncoated portion connected to each other are connected to the cathode tab, one end of the second cathode conductive member is connected to the second cathode uncoated portion and the fourth cathode uncoated portion and the other end of the second cathode conductive member is connected to the first cathode uncoated portion and the third cathode uncoated portion such that the second cathode uncoated portion and the fourth cathode uncoated portion connected to each other are connected to the first cathode uncoated portion and the third cathode uncoated portion connected to each other, one end of the first anode conductive member is connected to the first anode uncoated portion and the third anode uncoated portion and the other end of the first anode conductive member is connected to the anode tab such that the first anode uncoated portion and the third anode uncoated portion connected to each other are connected to the anode tab, and one end of the second anode conductive member is connected to the second anode uncoated portion and the fourth anode uncoated portion and the other end of the second anode conductive member is connected to the first anode uncoated portion and the third anode uncoated portion such that the second anode uncoated portion and the fourth anode uncoated portion connected to each other are connected to the first anode uncoated portion and the third anode uncoated portion connected to each other, wherein the first electrode assembly, the second electrode assembly, the third electrode assembly, the first and second cathode conductive members and the first and second anode conductive members are enclosed within a case, further comprising a support member supporting the first electrode assembly, the second electrode assembly, and the third electrode assembly, wherein the first cathode conductive member, the second cathode conductive member, the first anode conductive member, and the second anode conductive member are provided on the support member, and wherein a plurality of protrusions upwardly protruding and spaced apart from each other are provided on the support member, when the plurality of protrusions are referred to as a first protrusion and a second protrusion each from a left side, the first electrode assembly is disposed on the support member positioned at a left side of the first protrusion, the second electrode assembly is disposed on the support member positioned at a right side of the second protrusion, and the third electrode assembly is disposed on the support member positioned between the first protrusion and the second protrusion, the first cathode uncoated portion and the third cathode uncoated portion are connected to the first cathode conductive member and the second cathode conductive member at the first protrusion, and the second cathode uncoated portion and the fourth cathode uncoated portion are connected to the second cathode conductive member at the second protrusion, and the second anode uncoated portion and the fourth anode uncoated portion are connected to the first anode conductive member and the second anode conductive member at the second protrusion, and the first anode uncoated portion and the third anode uncoated portion are connected to the second anode conductive member at the first protrusion.

6. The long width secondary battery of claim 5, wherein the first cathode conductive member, the second cathode conductive member, the first anode conductive member, and the second anode conductive member are formed in a plate shape.

7. The long width secondary battery of claim 6, wherein thicknesses of the first cathode conductive member and the second cathode conductive member are larger than those of the first cathode current collector, the second cathode current collector, and the third cathode current collector, and thicknesses of the first anode conductive member and the second anode conductive member are larger than those of the first anode current collector, the second anode current collector, and the third anode current collector.

8. The long width secondary battery of claim 5, wherein the first cathode current collector, the second cathode current collector, the third cathode current collector, the first cathode conductive member, and the second cathode conductive member are formed of the same materials, and the first anode current collector, the second anode current collector, the third anode current collector, the first anode conductive member, and the second anode conductive member are formed of the same materials.

* * * * *